US008832256B2

(12) United States Patent
DeHaan et al.

(10) Patent No.: US 8,832,256 B2
(45) Date of Patent: Sep. 9, 2014

(54) PROVIDING A RESCUE ENVIRONMENT IN A SOFTWARE PROVISIONING ENVIRONMENT

(75) Inventors: Michael Paul DeHaan, Morrisville, NC (US); Adrian Karstan Likins, Durham, NC (US); Seth Kelby Vidal, Durham, NC (US)

(73) Assignee: Red Hat, Inc., Raleigh, NC (US)

( * ) Notice: Subject to any disclaimer, the term of this patent is extended or adjusted under 35 U.S.C. 154(b) by 362 days.

(21) Appl. No.: 12/325,007

(22) Filed: Nov. 28, 2008

(65) Prior Publication Data

US 2010/0138521 A1 Jun. 3, 2010

(51) Int. Cl.
*G06F 15/177* (2006.01)
*G06F 11/07* (2006.01)
*G06F 11/24* (2006.01)

(52) U.S. Cl.
CPC ........ *G06F 11/0793* (2013.01); *G06F 11/0748* (2013.01); *G06F 11/24* (2013.01)
USPC ............ 709/224; 709/220; 709/221; 709/223

(58) Field of Classification Search
CPC .. G06F 11/0793; G06F 11/1748; G06F 11/24
USPC ................... 709/220, 221, 223, 224
See application file for complete search history.

(56) References Cited

U.S. PATENT DOCUMENTS

| | | |
|---|---|---|
| 5,787,246 A | 7/1998 | Lichtman et al. |
| 5,835,719 A | 11/1998 | Gibson et al. |
| 5,948,062 A | 9/1999 | Tzelnic et al. |
| 6,105,100 A | 8/2000 | Dean et al. |
| 6,212,585 B1 | 4/2001 | Chrabaszcz |
| 6,243,747 B1 | 6/2001 | Lewis et al. |
| 6,272,536 B1 | 8/2001 | van Hoff et al. |
| 6,381,742 B2 | 4/2002 | Forbes et al. |
| 6,415,289 B1 | 7/2002 | Williams et al. |
| 6,438,711 B2 | 8/2002 | Woodruff |
| 6,516,427 B1 | 2/2003 | Keyes et al. |
| 6,526,442 B1 | 2/2003 | Stupek et al. |
| 6,543,047 B1 * | 4/2003 | Vrhel et al. .................. 717/121 |
| 6,550,021 B1 | 4/2003 | Dalphy et al. |
| 6,557,169 B1 | 4/2003 | Erpeldinger |
| 6,594,664 B1 | 7/2003 | Estrada et al. |
| 6,601,096 B1 * | 7/2003 | Lassiter, Jr. .................. 709/222 |
| 6,625,742 B1 | 9/2003 | Owhadi et al. |
| 6,640,316 B1 * | 10/2003 | Martin et al. .................. 714/36 |
| 6,686,838 B1 | 2/2004 | Rezvani et al. |
| 6,751,659 B1 | 6/2004 | Fenger et al. |

(Continued)

OTHER PUBLICATIONS

DeHaan, "Systems and Methods for Providing Configuration Management Services from a Provisioning Server", U.S. Appl. No. 12/414,941, filed Mar. 31, 2009.

(Continued)

*Primary Examiner* — Hieu Hoang
(74) *Attorney, Agent, or Firm* — Lowenstein Sandler LLP

(57) ABSTRACT

A provisioning server can remotely deliver a rescue environment to a malfunctioning target machine. The provisioning server can operate in conjunction with a network management server in order to identify malfunctioning target machines, for example, target machines with damaged operating systems. Once a malfunctioning target machine is identified, the provisioning server can be configured to identify a rescue environment to repair the malfunctioning target machine and provide the rescue environment to the malfunctioning target machine.

15 Claims, 4 Drawing Sheets

(56) References Cited

U.S. PATENT DOCUMENTS

| | | | |
|---|---|---|---|
| 6,757,837 B1 * | 6/2004 | Platt et al. | 714/4 |
| 6,769,022 B1 | 7/2004 | DeKoning et al. | |
| 6,779,004 B1 | 8/2004 | Zintel | |
| 6,845,464 B2 | 1/2005 | Gold | |
| 6,865,737 B1 | 3/2005 | Lucas et al. | |
| 6,922,722 B1 * | 7/2005 | Mann et al. | 709/220 |
| 6,947,939 B2 | 9/2005 | Fujibayashi et al. | |
| 6,986,033 B2 | 1/2006 | Miyamoto et al. | |
| 7,013,461 B2 | 3/2006 | Hellerstein et al. | |
| 7,051,101 B1 | 5/2006 | Dubrovsky et al. | |
| 7,107,330 B1 | 9/2006 | Hamilton et al. | |
| 7,133,822 B1 * | 11/2006 | Jacobson | 703/28 |
| 7,165,109 B2 | 1/2007 | Chiloyan et al. | |
| 7,185,071 B2 * | 2/2007 | Berg et al. | 709/220 |
| 7,200,845 B2 | 4/2007 | Morrison et al. | |
| 7,206,833 B1 * | 4/2007 | Sarangam et al. | 709/224 |
| 7,225,245 B2 * | 5/2007 | Gurumoorthy et al. | 709/223 |
| 7,315,962 B2 * | 1/2008 | Neuman et al. | 714/36 |
| 7,340,637 B2 | 3/2008 | Nagoya | |
| 7,350,112 B2 | 3/2008 | Fox et al. | |
| 7,356,679 B1 | 4/2008 | Le et al. | |
| 7,395,322 B2 | 7/2008 | Harvey et al. | |
| 7,506,040 B1 | 3/2009 | Rabe et al. | |
| 7,506,151 B2 | 3/2009 | Miyamoto et al. | |
| 7,516,218 B2 | 4/2009 | Besson | |
| 7,519,691 B2 | 4/2009 | Nichols et al. | |
| 7,574,481 B2 | 8/2009 | Moore et al. | |
| 7,600,005 B2 | 10/2009 | Jamkhedkar et al. | |
| 7,606,868 B1 | 10/2009 | Le et al. | |
| 7,640,325 B1 | 12/2009 | DeKoning et al. | |
| 7,681,080 B2 | 3/2010 | Abali et al. | |
| 7,716,316 B2 | 5/2010 | Nichols et al. | |
| 7,734,717 B2 | 6/2010 | Saarimaki et al. | |
| 7,827,261 B1 | 11/2010 | Griswold et al. | |
| 7,831,997 B2 | 11/2010 | Eldar et al. | |
| 7,937,437 B2 | 5/2011 | Fujii | |
| 2002/0062259 A1 | 5/2002 | Katz et al. | |
| 2002/0078186 A1 | 6/2002 | Engel et al. | |
| 2002/0138567 A1 | 9/2002 | Ogawa | |
| 2002/0162028 A1 | 10/2002 | Kennedy | |
| 2003/0005097 A1 | 1/2003 | Barnard et al. | |
| 2003/0055919 A1 | 3/2003 | Fong et al. | |
| 2003/0069884 A1 | 4/2003 | Nair et al. | |
| 2003/0069946 A1 | 4/2003 | Nair et al. | |
| 2003/0070110 A1 | 4/2003 | Aija et al. | |
| 2003/0074549 A1 | 4/2003 | Paul et al. | |
| 2003/0110173 A1 | 6/2003 | Marsland | |
| 2003/0119480 A1 | 6/2003 | Mohammed | |
| 2003/0126585 A1 * | 7/2003 | Parry | 717/124 |
| 2003/0195921 A1 | 10/2003 | Becker et al. | |
| 2003/0212992 A1 | 11/2003 | Ronning et al. | |
| 2004/0006616 A1 | 1/2004 | Quinn et al. | |
| 2004/0015831 A1 | 1/2004 | Bowhill | |
| 2004/0015957 A1 | 1/2004 | Zara et al. | |
| 2004/0019876 A1 | 1/2004 | Dravida et al. | |
| 2004/0024984 A1 | 2/2004 | Lanzatella et al. | |
| 2004/0044643 A1 | 3/2004 | deVries et al. | |
| 2004/0054789 A1 | 3/2004 | Breh et al. | |
| 2004/0059703 A1 | 3/2004 | Chappell et al. | |
| 2004/0064501 A1 | 4/2004 | Jan et al. | |
| 2004/0128375 A1 | 7/2004 | Rockwell | |
| 2004/0143664 A1 | 7/2004 | Usa et al. | |
| 2004/0167975 A1 | 8/2004 | Hwang et al. | |
| 2004/0215755 A1 | 10/2004 | O'Neill | |
| 2004/0223469 A1 | 11/2004 | Bahl et al. | |
| 2005/0028025 A1 | 2/2005 | Zalewski et al. | |
| 2005/0050175 A1 | 3/2005 | Fong et al. | |
| 2005/0055691 A1 * | 3/2005 | O'Neal | 717/174 |
| 2005/0060398 A1 * | 3/2005 | Owhadi et al. | 709/223 |
| 2005/0081119 A1 * | 4/2005 | DiZoglio et al. | 714/47 |
| 2005/0114474 A1 | 5/2005 | Anderson et al. | |
| 2005/0125525 A1 | 6/2005 | Zhou et al. | |
| 2005/0138159 A1 * | 6/2005 | Challener et al. | 709/223 |
| 2005/0177829 A1 | 8/2005 | Vishwanath | |
| 2005/0182796 A1 | 8/2005 | Chu et al. | |
| 2005/0198629 A1 | 9/2005 | Vishwanath | |
| 2005/0223374 A1 * | 10/2005 | Wishart et al. | 717/173 |
| 2006/0041767 A1 | 2/2006 | Maxwell et al. | |
| 2006/0080659 A1 | 4/2006 | Ganji | |
| 2006/0095230 A1 | 5/2006 | Grier et al. | |
| 2006/0095702 A1 | 5/2006 | Hickman et al. | |
| 2006/0155857 A1 | 7/2006 | Feenan et al. | |
| 2006/0173912 A1 | 8/2006 | Lindvall et al. | |
| 2006/0174018 A1 | 8/2006 | Zhu et al. | |
| 2006/0190575 A1 | 8/2006 | Harvey et al. | |
| 2006/0190773 A1 * | 8/2006 | Rao et al. | 714/38 |
| 2006/0200658 A1 | 9/2006 | Penkethman | |
| 2006/0215575 A1 | 9/2006 | Horton et al. | |
| 2006/0218544 A1 | 9/2006 | Chakraborty et al. | |
| 2006/0230165 A1 | 10/2006 | Zimmer et al. | |
| 2006/0282479 A1 | 12/2006 | Johnson et al. | |
| 2007/0015538 A1 | 1/2007 | Wang | |
| 2007/0067419 A1 * | 3/2007 | Bennett | 709/219 |
| 2007/0101118 A1 | 5/2007 | Raghunath et al. | |
| 2007/0118654 A1 | 5/2007 | Jamkhedkar et al. | |
| 2007/0168721 A1 | 7/2007 | Luiro et al. | |
| 2007/0169093 A1 | 7/2007 | Logan et al. | |
| 2007/0192158 A1 | 8/2007 | Kim | |
| 2007/0204338 A1 | 8/2007 | Aiello et al. | |
| 2007/0226227 A1 * | 9/2007 | Helfman | 707/10 |
| 2007/0226810 A1 | 9/2007 | Hotti | |
| 2007/0244996 A1 | 10/2007 | Ahmed et al. | |
| 2007/0276905 A1 | 11/2007 | Durand et al. | |
| 2007/0288612 A1 | 12/2007 | Hall | |
| 2007/0294376 A1 | 12/2007 | Ayachitula et al. | |
| 2007/0299951 A1 | 12/2007 | Krithivas | |
| 2008/0028048 A1 | 1/2008 | Shekar et al. | |
| 2008/0040452 A1 | 2/2008 | Rao et al. | |
| 2008/0046708 A1 | 2/2008 | Fitzgerald et al. | |
| 2008/0059959 A1 | 3/2008 | Chen et al. | |
| 2008/0065767 A1 * | 3/2008 | Stachura et al. | 709/224 |
| 2008/0130639 A1 | 6/2008 | Costa-Requena et al. | |
| 2008/0177994 A1 * | 7/2008 | Mayer | 713/2 |
| 2008/0189693 A1 | 8/2008 | Pathak | |
| 2008/0196043 A1 | 8/2008 | Feinleib et al. | |
| 2008/0235266 A1 | 9/2008 | Huang et al. | |
| 2008/0235361 A1 | 9/2008 | Crosbie et al. | |
| 2008/0244325 A1 | 10/2008 | Tyulenev | |
| 2008/0263192 A1 * | 10/2008 | Murphy et al. | 709/223 |
| 2008/0270674 A1 | 10/2008 | Ginzton | |
| 2008/0294777 A1 | 11/2008 | Karve et al. | |
| 2008/0301666 A1 | 12/2008 | Gordon et al. | |
| 2008/0313716 A1 | 12/2008 | Park | |
| 2008/0320110 A1 | 12/2008 | Pathak | |
| 2009/0007091 A1 | 1/2009 | Appiah et al. | |
| 2009/0055901 A1 | 2/2009 | Kumar et al. | |
| 2009/0064132 A1 | 3/2009 | Suchy et al. | |
| 2009/0089567 A1 | 4/2009 | Boland et al. | |
| 2009/0089852 A1 * | 4/2009 | Randolph et al. | 725/131 |
| 2009/0106291 A1 | 4/2009 | Ku et al. | |
| 2009/0129597 A1 | 5/2009 | Zimmer et al. | |
| 2009/0132682 A1 | 5/2009 | Counterman | |
| 2009/0132710 A1 | 5/2009 | Pelley | |
| 2009/0158148 A1 | 6/2009 | Vellanki et al. | |
| 2009/0158272 A1 | 6/2009 | El-Assir et al. | |
| 2009/0164522 A1 | 6/2009 | Fahey | |
| 2009/0165099 A1 | 6/2009 | Eldar et al. | |
| 2009/0172430 A1 | 7/2009 | Takenouchi | |
| 2009/0240835 A1 | 9/2009 | Adelman et al. | |
| 2009/0259665 A1 | 10/2009 | Howe et al. | |
| 2009/0265707 A1 | 10/2009 | Goodman et al. | |
| 2009/0282404 A1 | 11/2009 | Khandekar et al. | |
| 2009/0285199 A1 | 11/2009 | Strahs et al. | |
| 2009/0319806 A1 * | 12/2009 | Smith et al. | 713/193 |
| 2010/0023740 A1 | 1/2010 | Moon et al. | |
| 2010/0100876 A1 | 4/2010 | Glover et al. | |
| 2010/0100826 A1 | 4/2010 | Sugawara | 709/224 |
| 2010/0217837 A1 | 8/2010 | Ansari et al. | |
| 2010/0220584 A1 | 9/2010 | DeHaan et al. | |
| 2010/0223504 A1 | 9/2010 | DeHaan et al. | |
| 2010/0223608 A1 | 9/2010 | DeHaan et al. | |
| 2010/0223609 A1 | 9/2010 | DeHaan et al. | |
| 2011/0271090 A1 * | 11/2011 | Zimmer et al. | 713/2 |
| 2013/0007729 A1 * | 1/2013 | Sirotkin | 718/1 |

(56) References Cited

U.S. PATENT DOCUMENTS

OTHER PUBLICATIONS

DeHaan, "Systems and Methods for Retiring Target Machines by a Provisioning Server", U.S. Appl. No. 12/475,427, filed May 29, 2009.
DeHean, "Methods and Systems for Centrally Managing Multiple Provisioning Servers", U.S. Appl. No. 12/201,193, filed Aug. 29, 2008.
DeHaan, "Methods and Systems for Assigning Provisioning Servers in a Software Provisioning Environment", U.S. Appl. No. 12/201,646, filed Aug. 29, 2008.
DeHaan, "Methods and Systems for Providing Remote Software Provisioning to Machines", U.S. Appl. No. 12/195,633, filed Aug. 21, 2008.
DeHaan, "Systems and Methods for Storage Allocation in Provisioning of Virtual Machines", U.S. Appl. No. 12/202,178, filed Aug. 29, 2008.
DeHaan, "Methods and Systems for Providing Customized Actions Related to Software Provisioning", U.S. Appl. No. 12/200,552, filed Aug. 28, 2008.
DeHaan, "Methods and Systems for Automatically Locating a Provisioning Server", U.S. Appl. No. 12/198,290, filed Aug. 26, 2008.
DeHaan, "Methods and Systems for Managing Access in a Software Provisioning Environment", U.S. Appl. No. 12/201,832, filed Aug. 29, 2008.
DeHaan, "Methods and Systems for Importing Software Distributions in a Software Provisioning Environment", U.S. Appl. No. 12/200,631, filed Aug. 28, 2008.
DeHaan et al., "Methods and Systems for Managing Network Connections Associated with Provisioning Objects in a Software Provisioning Environment", U.S. Appl. No. 12/239,690, filed Sep. 26, 2008.
DeHaan, "Methods and Systems for Monitoring Software Provisioning", U.S. Appl. No. 12/198,378, filed Aug. 26, 2008.
DeHaan, "Systems and Methods for Software Provisioning in Multiple Network Configuration Environment", U.S. Appl. No. 12/202,194, filed Aug. 29, 2008.
DeHaan, "Systems and Methods for Differential Software Provisioning on Virtual Machines Having Different Configurations", U.S. Appl. No. 12/202,019, filed Aug. 29, 2008.
DeHaan, "Methods and Systems for Automatically Registering New Machines in a Software Provisioning Environment", U.S. Appl. No. 12/194,754, filed Aug. 20, 2008.
DeHaan, "Systems and Methods for Software Provisioning Machines Having Virtual Storage Resources", U.S. Appl. No. 12/202,189, filed Aug. 29, 2008.
DeHaan et al., "Methods and Systems for Managing Network Connections in a Software Provisioning Environment", U.S. Appl. No. 12/239,681, filed Sep. 26, 2008.
DeHaan et al., "Systems and Methods for Monitoring Hardware Resources in a Software Provisioning Environment", U.S. Appl. No. 12/325,056, filed Nov. 28, 2008.
DeHaan, "Methods and Systems for Providing Power Management Services in a Software Provisioning Environment", U.S. Appl. No. 12/277,518, filed Nov. 25, 2008.
DeHaan et al., "Methods and Systems for Providing Hardware Updates in a Software Provisioning Environment", U.S. Appl. No. 12/324,991, filed Nov. 28, 2008.
DeHaan et al., "Methods and Systems for Supporting Multiple Name Servers in a Software Provisioning Environment", U.S. Appl. No. 12/324,572, filed Nov. 26, 2008.
DeHaan et al., "Methods and Systems for Secure Gated File Deployment Associated with Provisioning", U.S. Appl. No. 12/393,754, filed Feb. 26, 2009.
DeHaan, "Systems and Methods for Integrating Software Provisioning and Configuration Management", U.S. Appl. No. 12/395,379, filed Feb. 27, 2009.
DeHaan, "Systems and Methods for Abstracting Software Content Management in a Software Provisioning Environment", U.S. Appl. No. 12/395,273, filed Feb. 27, 2009.
DeHaan et al., "Systems and Methods for Providing a Library of Virtual Images in a Software Provisioning Environment", U.S. Appl. No. 12/395,351, filed Feb. 27, 2009.
DeHaan et al., "Systems and Methods for Inventorying Un-Provisioned Systems in a Software Provisioning Environment", U.S. Appl. No. 12/391,588, filed Feb. 24, 2009.
DeHaan et al., "Systems and Methods for Managing Configurations of Storage Devices in a Software Provisioning Environment", U.S. Appl. No. 12/393,613, filed Feb. 26, 2009.
DeHaan et al., "Systems and Methods for Collecting and Altering Firmware Configurations of Target Machines in a Software Provisioning Environment", U.S. Appl. No. 12/393,319, filed Feb. 26, 2009.
DeHaan et al., "Methods and Systems for Replicating Provisioning Servers in a Software Provisioning Environment", U.S. Appl. No. 12/392,508, filed Feb. 25, 2009.
DeHaan, "Systems and Methods for Cloning Target Machines in a Software Provisioning Environment", U.S. Appl. No. 12/473,014, filed May 27, 2009.
DeHaan, "Methods and Systems for Provisioning Software", U.S. Appl. No. 11/763,315, filed Jun. 14, 2007.
DeHaan, "Methods and Systems for Provisioning Software", U.S. Appl. No. 11/763,333, filed Jun. 14, 2007.
DeHaan, "Systems and Methods for Message-Based Installation Management Using Message Bus", U.S. Appl. No. 12/495,077, filed Jun. 30, 2009.
Henson, "Systems and Methods for Integrating Storage Resources from Storage Area Network in Machine Provisioning Platform", U.S. Appl. No. 12/628,041, flied Nov. 30, 2009.
Henson, "Systems and Methods for Mounting Specified Storage Resources from Storage Area Network in Machine Provisioning Platform", U.S. Appl. No. 12/627,988, filed Nov. 30, 2009.
Doc Searls "Linux for Suits", 2005, Specialized System Consultants Inc., vol. 2005.
Grosse, "Repository Mirroring", 1995.
Butt et al., "Automated Installation of Large-Scale Linux Networks", 2000.
Agarwalla, "Automating Provisioning of Complete Software Stack in a Grid Environment", 2004.
Anderson et al., "Technologies for Large-Scale Configuration Management", Dec. 9, 2002.
eBook "Microsoft System Management Server 2003 Administrator's companion", Microsoft Press, c2004, Ch. 13, Patch Management, pp. 471-507.
HP Storage Essentials SRM 6.0 Installation Guide. Jan. 2008. HP. 1st ed. Part No. T4283-96113. pp. 1-5, 97-136, 219-228.
HP Storage Essentials SRM 6.0 User Guide. Jan. 2008. HP. 1st ed. Part No. T4238-96114. pp. 1-83.
Michael DeHaan. "Unfiled Provisioning", 2007.
Michael DeHaan. "Provisioning With Cobbler". 2007.
Tan et al. "A WBEM Basked Disk Array Management Provider". 2005. IEEE. 2005 International Conference on Cyberworlds.
Lovelace et al. Managing Disk Subsystems using IBM TotalStorage Productivity Center. Sep. 2005. IBM, 2nd ed SG24-7097-01. pp. 1-42.

\* cited by examiner

PROVIDING A RESCUE ENVIRONMENT IN A SOFTWARE PROVISIONING ENVIRONMENT

FIELD

This invention relates generally to software provisioning.

DESCRIPTION OF THE RELATED ART

Software provisioning is the process of selecting a target machine, such as a server, loading the appropriate software (operating system, device drivers, middleware, and applications), and customizing and configuring the system and the software to make it ready for operation. Software provisioning can entail a variety of tasks, such as creating or changing a boot image, specifying parameters, e.g. IP address, IP gateway, to find associated network and storage resources, and then starting the machine and its newly-loaded software. Typically, a system administrator will perform these tasks using various tools because of the complexity of these tasks. Unfortunately, there is a lack of provisioning control tools that can adequately integrate and automate these tasks.

Often, computer systems will fail due to incompatibility of software and hardware, viruses on the computer system, and the like. If the failure is critical, the computer system may not be able to boot due to a corruption of the operating system. To combat this problem, rescue disks, such as compact disks (CDs) and digital versatile disks (DVDs), are maintained by administrators of the computer systems. The rescue disk enables the damaged system to boot and allows the computer system to be repaired. In a networked computer environment, when a computer system fails, the network administrator has to physically deliver the rescue disk to the computer system and repair the computer system locally.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
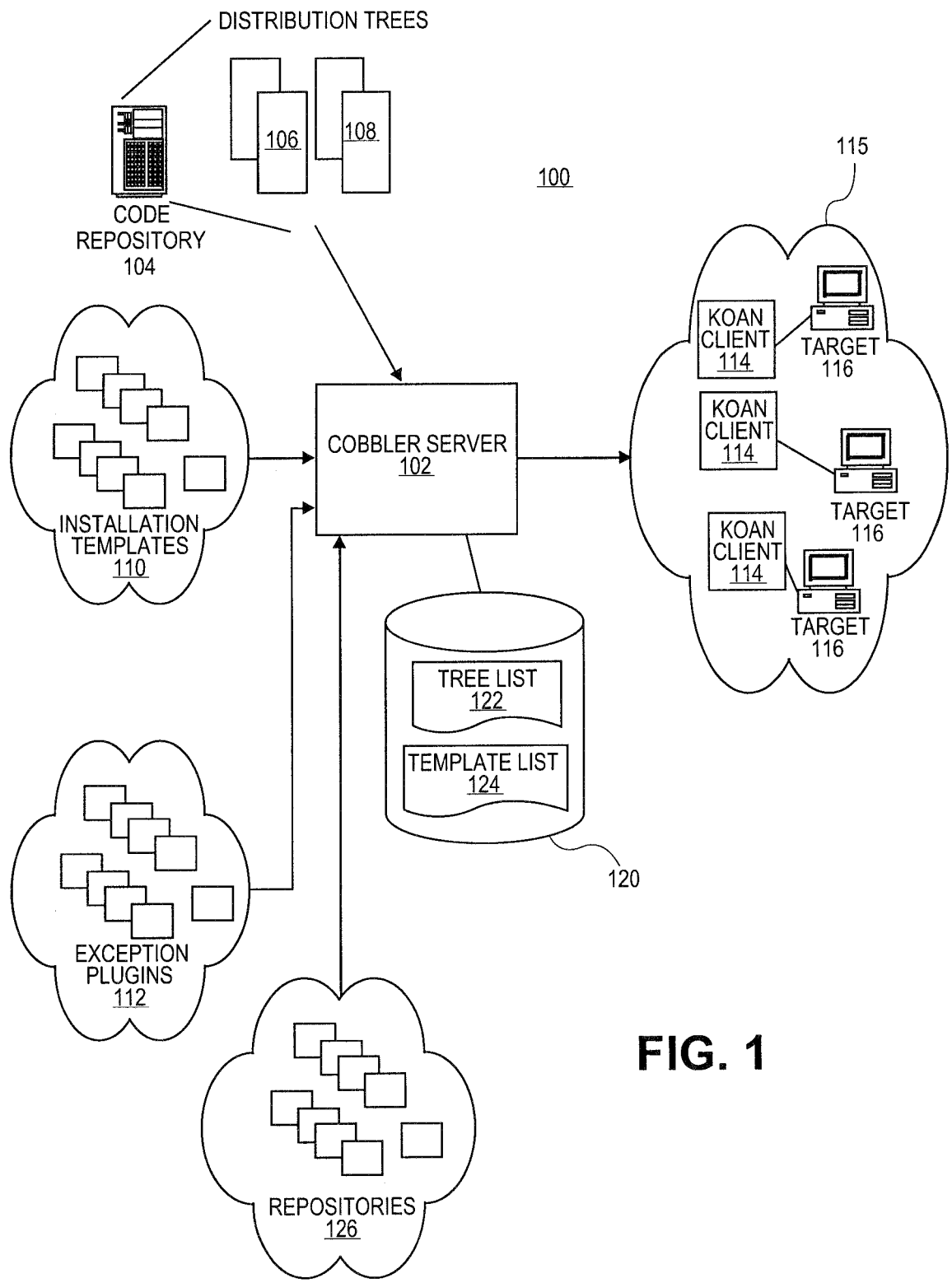
FIG. 1 illustrates an overall provisioning environment in which various embodiments of the present teachings can be practiced.

For simplicity and illustrative purposes, the principles of the present invention are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for repairing target machines in a software provisioning environment. More particularly, a provisioning server can remotely deliver a rescue environment to a malfunctioning target machine.

According to embodiments, a provisioning server can be configured to operate in conjunction with a network management server in order to identify malfunctioning target machines, for example, target machines with damaged operating systems. The provisioning server can be configured to receive an identification of a target machine that is malfunctioning from the network management server. Likewise, the provisioning server can be configured to instruct the network management server to locate and identify any malfunctioning target machines.

According to embodiments, once a malfunctioning target machine is identified, the provisioning server can be configured to identify a rescue environment to repair the malfunctioning target machine. The rescue environment can be configured to execute on the malfunctioning target machine and allow the provisioning server to diagnose and repair the malfunctioning target machine. The provisioning server can be configured to identify the rescue environment by locating the specifications of the malfunctioning target machine (software and/or hardware) and locating a rescue environment compatible with the specifications of the malfunctioning target machine. The provisioning server can be configured to provide the rescue environment to the malfunctioning target machine via a network connection.

According to embodiments, the provisioning server can be configured to communicate with the rescue environment in order to diagnose and repair the malfunctioning target machine. For example, the provisioning server can alter settings and parameters of software on the malfunctioning target machine. Additionally, the provisioning server can be configured to maintain a record of previous software installed on the malfunctioning target machine. If necessary, the provisioning server can be configured to identity the previously installed software on the malfunctioning target machine and provide the previously installed software to the malfunctioning target machine for re-installation.

By providing a rescue environment from a provisioning server, a damaged or malfunctioning computer system can be repaired remotely at the provisioning server. As such, malfunctioning computer systems can be repaired without requiring an administrator to physically visit the malfunctioning computer systems.

FIG. 1 illustrates an overall provisioning environment 100, in systems and methods for the execution, management, and monitoring of software provisioning, according to exemplary aspects of the present disclosure. Embodiments described herein can be implemented in or supported by the exemplary environment illustrated in FIG. 1. The provisioning environment 100 provides a unified provisioning environment, which comprehensively manages the tasks related to software provisioning.

In particular, the provisioning environment 100 can manage software provisioning using a hierarchy of commands. In exemplary embodiments, the hierarchy can include at least four levels of commands. The lowest level in the hierarchy can comprise distribution commands, which primarily handle base operating system specific tasks of provisioning. The second level can comprise profile commands, which associate a configuration file, such as a kickstart file for Linux or other operating system, with a distribution and optionally allow for customization. The third level comprises system commands, which associate remote systems that are involved with the provisioning of the software. The fourth level comprises repository commands, which address configurations and tasks related to updating the software, remote installation procedures, and optionally customizing the software.

The provisioning environment 100 provides several capabilities and advantages over the known provisioning solutions. For example, the present invention is capable of handling a variety of forms of installations, such as preboot execution environment ("PXE"), virtualization, re-installations, and image installations.

In exemplary aspects, the provisioning environment 100 enables integrating virtualization into a PXE provisioning infrastructure and provides several options to reinstall running machines as well. The provisioning environment 100 can integrate mirroring of package repositories with the provisioning process, so that a provisioning server may serve as a central mirror point of contact for all of an organizations software needs. In aspects, a set of remote mirrored repositories can automatically be used by provisioned systems without additional setup.

Reference will now be made in detail to the exemplary aspects the provisioning environment 100. The provisioning environment 100 can be applied to provisioning any form of software, such as Windows systems, UNIX systems, and Linux systems. In the exemplary description that follows, FIG. 1 is presented to explain the provisioning environment 100 for provisioning software, such as Linux, and Linux based software, such as Fedora and Red Hat Enterprise Linux by Red Hat, Inc.

In provisioning of software such as Linux, many system administrators use what is known as the "kickstart" installation method. Kickstart files are files that specify the intended configuration of the software being provisioned. Kickstart files can be kept on a server and can be read by individual computers during the installation. This installation method allows the use of a single or relatively few standard kickstart files to install Linux on multiple machines, making it ideal for network and system administrators.

The kickstart file can be a simple text file, containing a list of items, each identified by a keyword. In general, a kickstart file can be edited with any text editor or word processor that can save files as ASCII text. One skilled in the art will recognize that the present invention may be applied to non-kickstart files in software provisioning. For example, configuration files such as AutoYAST Answer files used in Novell SuSe Linux and Sun Solaris Jumpstart files may also be used by the provisioning environment 100.

Typically, a kickstart file can be copied to the boot disk, or made available on the network. The network-based approach is most commonly used, as most kickstart installations for software provisioning, such as Linux systems, tend to be performed via a network using NFS, FTP, or HTTP on networked computers. Administrators also find it desirable that kickstart installations can be performed using a local CD-ROM, or a local hard drive.

Using kickstart files, a system administrator can create a single file containing the parameters that are needed to complete a typical software installation. For example, kickstart files specify parameters related to: language selection; mouse configuration; keyboard selection; boot loader installation; disk partitioning; network configuration; NIS, LDAP, Kerberos, Hesiod, and Samba authentication; firewall configuration; and package selection.

According to exemplary aspects illustrated in FIG. 1, the provisioning environment 100 can include a provisioning server 102, a code repository 104 which provides access to distributions 106 and 108, a set of installation templates 110, a set of exception plugins 112, a helper client 114 running on target machines 116 in a network 115, a provisioning database 120 which comprises a distribution tree list 122 and template list 124. Each of these components will now be further described.

The provisioning server (from herein referred to as a "cobbler") 102 is responsible for: serving as an extensible markup language remote procedure call (XMLRPC) handler; linking to or mirroring install distribution trees and a configuration database; hosting kickstart templates; hosting plugins; generating installation images, and the like. The cobbler server 102 can be implemented as software, such as Python code, installed on a boot server machine and provide a command line interface for configuration of the boot server In addition, the cobbler server 102 can make itself available as a Python application programming interface (API) for use by higher level management software (not shown). The cobbler server 102 supports provisioning via PXE, image (ISO) installation, virtualization, re-provisioning. As will be described later, the last two modes are performed with the assistance of a helper client 114.

The code repository 104 is responsible for hosting distributions 106 and 108. The code repository 104 may be implemented using well known components of hardware and software. Additionally, the code repository 104 can be include one or more repositories hosting distributions. The distributions 106 and 108 can include bundles of software that are already compiled and configured. The distributions 106 and 108 may be in the form of either rpm, deb, tgz, msi, exe formats, and the like. For example, as Linux distributions, the distributions 106 and 108 are bundles of software that comprise the Linux kernel the non-kernel parts of the operating system, and assorted other software. The distributions 106 and 108 can take a variety of forms, from fully-featured desktop and server operating systems to minimal environments.

In exemplary aspects, the installation templates 110 are any data structure or processing element that can be combined with a set of installation configurations and processed to produce a resulting configuration file, such as a kickstart file.

In exemplary aspects, exception plugins 112 are software that interact with cobbler server 102 to customize the provisioning of software. In general, the exception plugins 112 are intended to address infrequent customization needs.

In exemplary aspects, the helper client (known as "koan", which stands for "kickstart-over-a-network") 114 can assist the cobbler server 102 during the provisioning processes. The koan 114 can allow for both network provisioning of new virtualized guests and destructive provisioning of any existing system. When invoked, the koan 114 can request profile information from a remote boot server that has been configured with the cobbler server 102. In some aspects, what the koan 114 does with the profile data depends on whether it was invoked with—virt or—replace-self.

In exemplary aspects, the koan 114 can enable replacing running systems as well as installing virtualized profiles. The koan 114 can also be pushed out to systems automatically from the boot server. In some aspects, the koan client 114 is also written in Python code to accommodate a variety of operating systems, machine architectures, etc.

In exemplary aspects, the network 115 can include a number of the target machines 116. The target machines 116 can represent the particular machines to which software provisioning is directed. The target machines 116 can represent a wide variety of computing devices, such as personal computers, servers, laptop computers, personal mobile devices, and the like. In some aspects, the target machines 116 can represent distributed computing environments such as cloud computing environments. Although FIG. 1 shows several of the target machines 116, the provisioning environment 100 can be capable of managing a wide range environments, such as datacenters with thousands of machines or server pools with just a few machines. Additionally, the cobbler server 102 can be connected to multiple networks 115.

In exemplary aspects, the provisioning database 120 can serve as a data storage location for holding data used by the cobbler server 102. For example, as shown, the provisioning database 120 can comprise the distribution tree list 122 and the template list 124. The distribution tree list 122 can provide an inventory of the distributions 106 and 108 that are hosted or mirrored by the cobbler server 102. The template list 124 can provide an inventory of the templates 110 that are hosted by the cobbler server 102.

As noted above, the cobbler server 102 can manage provisioning using a hierarchical concept of distribution commands, profile commands, system commands, and repository commands. This framework enables the cobbler server 102 to abstract the differences between multiple provisioning types (installation, reinstallation, and virtualization) and allows installation of all three from a common platform. This hierarchy of commands also permits the cobbler server 102 to integrate software repositories 126 with the provisioning process, thus allowing systems to be configured as a mirror for software updates and third party content as well as distribution content.

Distributions can contain information about base operating system tasks, such as what kernel and initial ramdisk ("initrd") are used in the provisioning, along with other information, such as required kernel parameters. Profiles associate one of the distributions 106 and 108 with a kickstart file and optionally customize it further, for example, using plugins 112. System commands associate a hostname, IP, or (machine access control) MAC with a distribution and optionally customize the profile further. Repositories contain update information, such as yum mirror information that the cobbler server 102 uses to mirror repository 104. The cobbler server 102 can also manage (generate) dynamic host configuration protocol (DHCP) configuration files using the templates 110.

In exemplary aspects, the cobbler server 102 can use a provisioning environment that is fully templated, allowing for kickstarts and PXE files to be customized by the user. The cobbler server 102 uses the concept of "profiles" as an intermediate step between the operating system and the installed system. A profile is a description of what a system does rather than the software to be installed For instance, a profile might describe a virtual web server with X amount of RAM, Y amounts of disk space, running a Linux distribution Z, and with an answer file W.

In exemplary aspects, the cobbler server 102 can provide a command line interface to configure a boot server in which it is installed. For example, the format of the cobbler server 102 commands can be generally in the format of: cobbler command [subcommand] [—arg1=][—arg2=]. Thus, a user can specify various aspects of software provisioning via a single interface, such as a command line interface or other known interface. Examples of exemplary cobbler commands can be found in U.S. patent application Ser. No. 11/763,315, U.S. Patent Application Publication No. 2008/0288938 and U.S. patent application Ser. No. 11/763,333, U.S. Patent Publication No. 2008/0288939, the disclosures of which are incorporated herein, in their entirety, by reference.

According to exemplary aspects, a user can use various commands of the provisioning environment 100 to specify distributions and install trees hosted by the code repository 104, such as a distribution from the distributions 106 or 108. A user can add or import a distribution or import it from installation media or an external network location.

According to exemplary aspects, in order to import a distribution, the cobbler server 102 can auto-add distributions and profiles from remote sources, whether this is an installation media (such as a DVD), an NFS path, or an rsync mirror. When importing a rsync mirror, the cobbler server 102 can try to detect the distribution type and automatically assign kickstarts. By default in some embodiments, the cobbler server can provision by erasing the hard drive, setting up eth0 for DHCP, and using a default password. If this is undesirable, an administrator may edit the kickstart files in /etc/cobbler to do something else or change the kickstart setting after the cobbler server 102 creates the profile.

According to exemplary aspects, a user may map profiles to the distributions and map systems to the profiles using profile commands and systems commands of the provisioning environment 100. A profile associates a distribution to additional specialized options, such as a kickstart automation file. In the cobbler server 102, profiles are the unit of provisioning and at least one profile exists for every distribution to be provisioned. A profile might represent, for instance, a web server or desktop configuration.

According to exemplary aspects, a user can map systems to profiles using system commands. System commands can assign a piece of hardware with cobbler server 102 to a profile. Systems can be defined by hostname, Internet Protocol (IP) address, or machine access control (MAC) address. When available, use of the MAC address to assign systems can be preferred.

According to exemplary aspects, the user can map repositories and profiles using repository commands. Repository commands can address configurations and tasks related to updating the software, remote installation procedures, and optionally customizing the software. These repository commands can also specify mirroring of the provisioned software to remote servers. Repository mirroring can allow the cobbler server 102 to mirror not only install the trees 106 and 108, but also optional packages, third party content, and updates. Mirroring can be useful for faster, more up-to-date installations and faster updates, or providing software on restricted networks. The cobbler server 102 can also include other administrative features, such as allowing the user to view their provisioning configuration or information tracking the status of a requested software installation.

According to exemplary aspects, a user can utilize commands to create a provisioning infrastructure from a distribution mirror. Then a default PXE configuration is created, so that by default systems will PXE boot into a fully automated install process for that distribution. The distribution mirror can be a network rsync mirror or a mounted DVD location.

According to exemplary aspects, the administrator uses a local kernel and initrd file (already downloaded), and shows how profiles would be created using two different kickstarts—one for a web server configuration and one for a database server. Then, a machine can be assigned to each profile.

According to exemplary aspects, a repo mirror can be set up for two repositories, and create a profile that will auto install those repository configurations on provisioned systems using that profile.

According to exemplary aspects, in addition to normal provisioning, the cobbler server 102 can support yet another option, called "enchant". Enchant takes a configuration that has already been defined and applies it to a remote system that might not have the remote helper program installed. Users can use this command to replace a server that is being repurposed, or when no PXE environment can be created. Thus, the enchant option allows the remote the koan client 114 to be executed remotely from the cobbler server 102.

According to aspects, if the cobbler server 102 is configured to mirror certain repositories, the cobbler server 102 can then be used to associate profiles with those repositories. Systems installed under those profiles can be auto configured to use these repository mirrors in commands and, if supported, these repositories can be leveraged. This can be useful for a large install base, when fast installation and upgrades for systems are desired, or software not in a standard repository exists and provisioned systems desire to know about that repository.

According to exemplary aspects, the cobbler server 102 can also keep track of the status of kickstarting machines. For example, the "cobbler status" will show when the cobbler server 102 thinks a machine started kickstarting and when it last requested a file. This can be a desirable way to track machines that may have gone inactive during kickstarts. The cobbler server 102 can also make a special request in the post section of the kickstart to signal when a machine is finished kickstarting.

According to exemplary aspects, for certain commands, the cobbler server 102 will create new virtualized guests on a machine in accordance with the orders from the cobbler server 102. Once finished, an administrator can use additional commands on the guest or other operations. The cobbler server 102 can automatically name domains based on their MAC addresses. For re-kickstarting, the cobbler server 102 can reprovision the system, deleting any current data and replacing it with the results of a network install.

According to exemplary aspects, the cobbler server 102 can configure boot methods for the provisioning requested by the user. For example, the cobbler server 102 can configure a PXE environment, such as a network card BIOS. Alternatively, the cobbler server 102 can compile and configure information for koan client 104. The cobbler server 102 can also optionally configure DHCP and DNS configuration information.

According to exemplary aspects, the cobbler server 102 can serve the request of the koan client 114. The koan client 114 can acknowledge the service of information of the cobbler server 102 and then can initiate installation of the software being provisioned. Additionally, the koan client 114 can either install the requested software, e.g., replace the existing operating system, or install a virtual machine.

Figure 2:
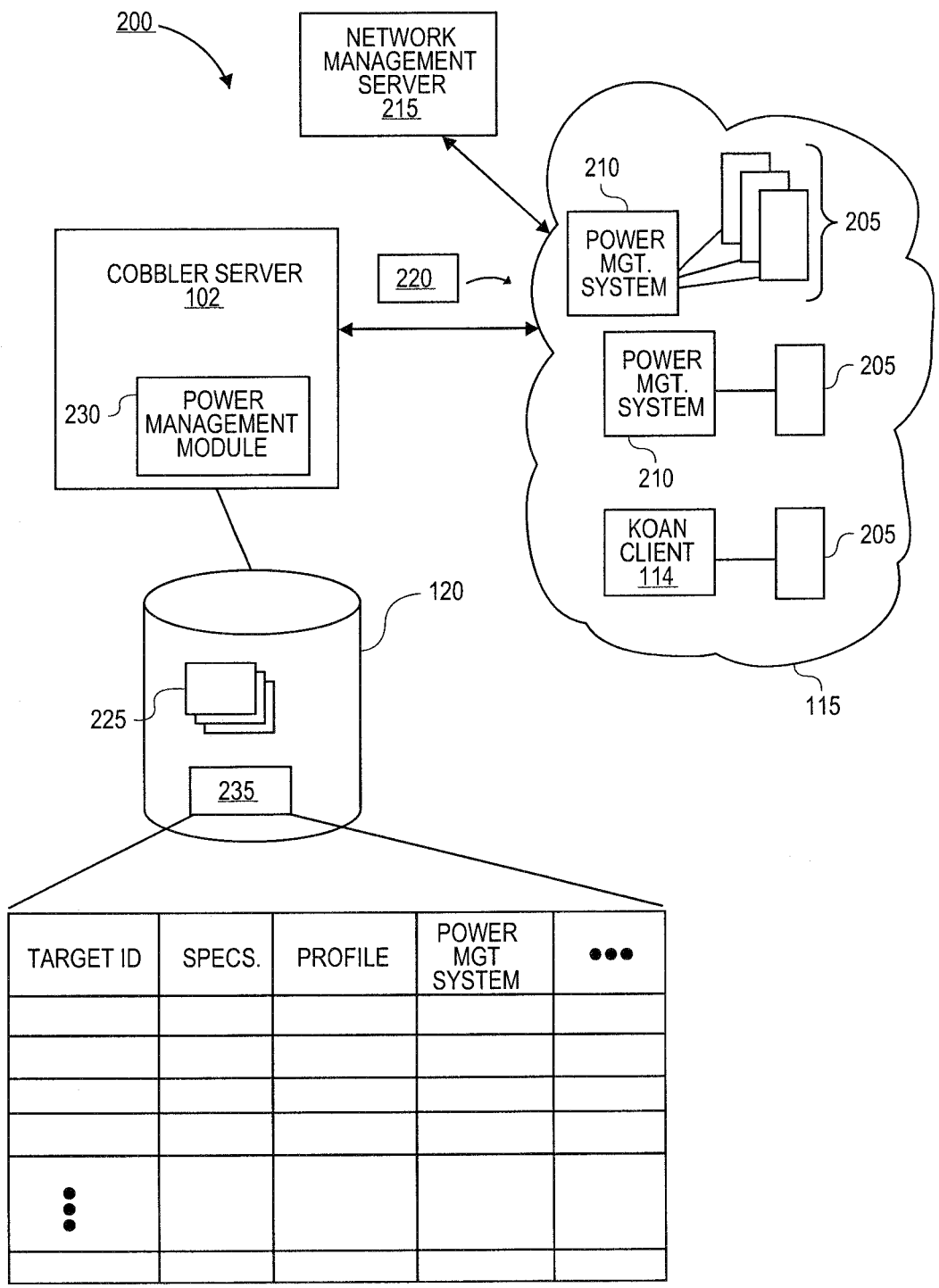
FIG. 2 illustrates the overall provisioning environment in which a provisioning server can provide a rescue environment to malfunctioning target machines, according to various embodiments.

FIG. 2 illustrates aspects of the provisioning environment 200 that allows for repair of target machines by remotely delivering a rescue environment. In embodiments as shown, the cobbler server 102 can be coupled to a network 115 to provide provisioning processes and other actions related to provisioning for the network 115. While FIG. 2 illustrates one network 115 with exemplary components, one skilled in the art will realize that the cobbler server 102 can be coupled to multiple networks to provide provisioning processes and other actions related to provisioning.

As shown in FIG. 2, the network 115 can include a number of target systems 205. For example, the target systems 205 can include a group of server computers, such as blade servers. The target systems 205 can include computing systems such as servers, personal computers, laptop computers, etc. The target systems 205 can be connected to power management systems 210 to control the power supplied to the target systems 205 and to alter the power state of one or more of the target systems 205 (e.g. power cycle). The power management systems 210 can be any type of system to manage the power of the target machines, for example, Integrated Lights Out (ILO) by Hewlett Packard™ Corporation, Dell™ Remote Access Control (DRAC) by Dell Corporation, WTI powerbar by Western Telematics, Inc, and other power system supporting network communications. Additionally, the target systems 205 can be configured to include a koan client 114.

In embodiments, the cobbler server 102 can be configured to identify and repair a malfunctioning target machine from the target machines 205. The malfunctioning target machine 205 can include a problem with hardware, software, and combinations thereof that causes the malfunctioning target machine to function improperly. For example, a target machine 205 can contain a damaged operating system that is unable to boot the target machine 205 due to various conditions such as viruses, incompatible hardware and/or software, mis-configured hardware and/or software, hardware failure, and the like.

The cobbler server 102 can be configured to operate in conjunction with a network management server 215 in order to identify the malfunctioning target machine 205. The network management server 215 can be any type of network management application or tool to securely communicate with the target machines 205 to monitor the state of the target machines 205 and to manage and direct the target machines 205. For example, the network management server 215 can be a "FUNC" server as described in U.S. patent application Ser. No. 12/130,424 filed May 30, 2008 entitled "SYSTEMS AND METHODS FOR REMOTE MANAGEMENT OF NETWORKED SYSTEMS USING SECURE MODULAR PLATFORM" (U.S. Patent Application Publication No. 2009/0300180) assigned to Red Hat Corporation, the disclosure of which is incorporated herein, in its entirety, by reference.

In embodiments, to identify a malfunctioning target machine 205, the cobbler server 102 can be configured to receive an identification of the target machine that is malfunctioning from the network management server 215. For example, the network management server 215 can monitor the target machines 205 and notify the cobbler server 102 of the malfunctioning target machine 205. Likewise, the cobbler server 102 can be configured to instruct the network management server 215 to locate and identify any malfunctioning target machines. Additionally, the cobbler server 102 can be configured to independently identify the malfunctioning target machine 205.

In embodiments, once a malfunctioning target machine 205 is identified, the cobbler server 102 can be configured to identify a rescue environment 220 from a set of rescue environments 225 to repair the malfunctioning target machine 205. The rescue environment 220 can be configured to execute on the malfunctioning target machine 205 and allow the cobbler server 102 to diagnose and repair the malfunctioning target machine 205. For example, the rescue environment 220 can be an application, an appliance, an image file, and the like. The rescue environment 220 can be configured to operate in conjunction with the hardware and software of the malfunctioning target machine 205 to provide a stable platform to review the configuration of the hardware and software, to identify problems, and to repair any problems.

The set of rescue environments 225 can include rescue environments for the different types of the target machines 205 in the network 115. For example, the set of the rescue environments 225 can include rescue environments for the different types of operating systems (OS) in the network 115. The cobbler server 102 can be configured to maintain the set of rescue environments 225 in the provisioning database 120. Likewise, the cobbler server 102 can be configured to maintain the set of rescue environments 225 in other types of storage or data systems. Additionally, the cobbler server 102 can be configured to locate and retrieve the set of rescue environments 225 from remote storage.

In embodiments, the cobbler server 102 can be configured to identify the rescue environment 220 by locating the specifications of the malfunctioning target machine (software and/or hardware) in an inventory 235 and locating the rescue environment 220 from the set of rescue environments 225 compatible with the specifications of the malfunctioning target machine. For example, the cobbler server 102 can locate the rescue environment 220 compatible with the operating system of the malfunctioning target machine 205. Additionally, the cobbler server 102 can be configured to maintain a reference to the rescue environment 220, which is compatible with the different target machines 205, in the inventory 235 associated with the appropriate target machine 205.

In embodiments, the inventory 235 can be configured to include information identifying the target machines 205. The information can include information that uniquely identifies the target machines 205 in the network 115 and the network management server 215, such as Media Access Control ("MAC") address, Ethernet Hardware Address ("EHA"), and the like. The information can also include other information that identifies the target machines 205 such as specifications of the target machines 205, network information of the target machines 205 (IP address, host name, etc.), and software installed on the target machines 205. The cobbler server 102 can also be configured to include, in the inventory 235, information about the power management systems 210 for the target machines 205. The information can include identification of the power management system 210, type of power management systems 210, communication protocol or tools utilized by the power management systems 210 (Intelligent Platform Management Interface (IPMI), Cluster Manager (CMAN), and the like), access information (login and password) for the power management system 210, and the like. The inventory 235 can be maintained in the provisioning database 120 or other storage.

Once the rescue environment 220 has be identified, the cobbler server 102 can be configured to provide the rescue environment 220 to the malfunctioning target machine 205 via a network connection with the network 115. Likewise, the cobbler server 102 can be configured to utilize the koan client 114 to assist in providing the rescue environment 220 to the malfunctioning target machine 205.

In embodiments, once provided to the malfunctioning target machine 205, the cobbler server 102 can be configured to communicate with rescue environment 220 in order to diagnose and repair the malfunctioning target machine 205. For example, the cobbler server 102 can utilize the rescue environment 220 to examine and alter settings and parameters of software, such as the OS, and hardware on the malfunctioning target machine 205. The cobbler server 102 can be configured to utilize the rescue environment 220 directly. Likewise, the cobbler server 102 can be configured to utilize the network management server 215 to interact with the rescue environment 220.

Additionally, the cobbler server 102 can be configured to maintain a record of previous software installed on the malfunctioning target machine 205. For example, the cobbler server 102 can maintain previous profiles installed on the malfunctioning target machine 205. The cobbler server 102 can be configured to maintain the previous installed software in the inventory 235. If necessary, the cobbler server 102 can be configured to identify the previously installed software on the malfunctioning target machine 205 and provide the previously installed software to the malfunctioning target machine 205 for re-installation. For example, the cobbler server 102 can identify a previously profile and provision software to the malfunctioning target machine 205 based on the previous profile.

In embodiments, after providing the rescue environment 220 to the malfunctioning target machine 205, the cobbler server 102 can be configured to alter a power state of the malfunctioning target machine 205. For example, the cobbler server 102 can power cycle (power down/power up) the malfunctioning target machine 205 in order to initiate the rescue environment 220 or restart the system after the repair. The cobbler server 102 can be configured to communicate with the power management systems 210 of the malfunctioning target machine 205 to alter the power state of the malfunctioning target machine 205. To achieve this, the cobbler server 102 can be configured to include a power management module 230.

In embodiments, the power management module 230 can be configured to communicate with the power management systems 210 of the target machines 205. The power management module 230 can be configured to instruct the power management systems 210 to alter the power state of the target machines 205. The power management module 230 can be configured to generate a command or instruction. The instruction can include access information for the power management systems 210 and the power state alteration to be performed. The power management module 230 can be configured to form the instruction in a protocol utilized by the particular power management systems 210. For example, the cobbler server 102 can be configured to utilize conventional or proprietary protocols or tools such as IPMI, DRAC, ILO, fence agents and the like. The power management module 230 can be configured to determine the protocol from the inventory 235. Once generated, the cobbler server 102 can be configured to transmit the instruction to the determined power management systems 210.

In embodiments, the power management module 230 can be implemented as a portion of the code for the cobbler server 102. Likewise, the power management module 230 can be implemented as a separate software tool accessible by the cobbler server 102. The power management module 230 can be written in a variety of programming languages, such as JAVA, C++, Python code, and the like to accommodate a variety of operating systems, machine architectures, etc. Additionally, the power management module 230 can be configured to include the appropriate application programming interfaces (APIs) to communicate with and cooperate with other components of the cobbler server 102.

In embodiments, the cobbler server 102 can provide the rescue environment 220 and interact with the rescue environment 220 directly or via the network management server 215. Likewise, the cobbler server 102 can be configured to interact with rescue environments already existing on a target machine 205 to perform the processes described above. For example, a user of a target machine 205 can initiate a rescue environment and the cobbler server 102 can be configured to interact with the user initiated rescue environment. Likewise, other applications and tools can interact with the rescue environment 220 provided by the cobbler server 102 to repair the target machine 205.

Figure 3:
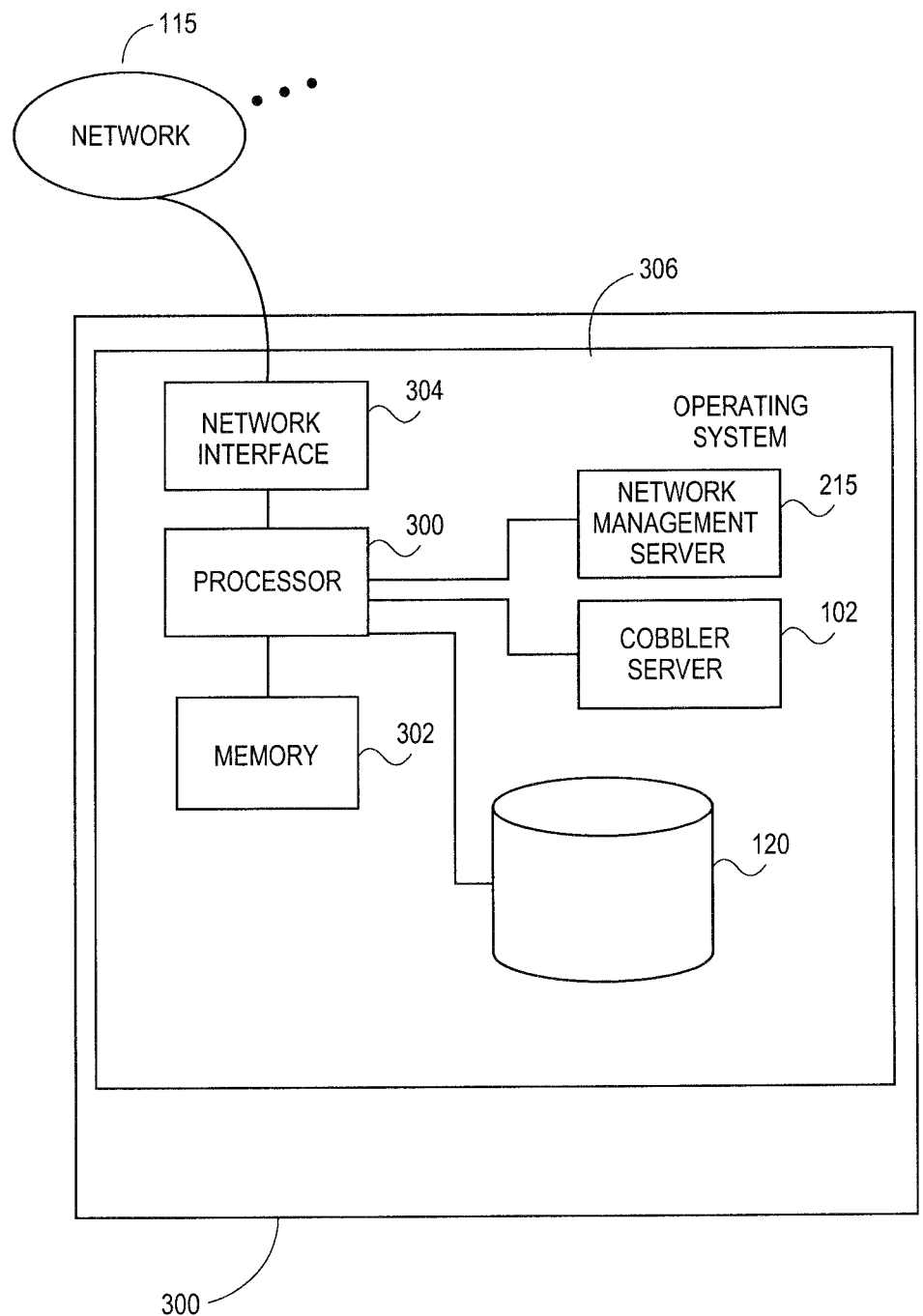
FIG. 3 illustrates an exemplary hardware configuration for a provisioning server, according to various embodiments.

FIG. 3 illustrates an exemplary diagram of hardware and other resources that can be incorporated in a computing system 300 configured to communicate with the network 115, and execute the cobbler server 102 and the network management server 215 according to embodiments. In embodiments as shown, the computing system 300 can comprise a processor 300 communicating with memory 302, such as electronic random access memory, operating under control of or in conjunction with operating system 306. Operating system 306 can be, for example, a distribution of the Linux™ operating system, the Unix™ operating system, or other open-source or proprietary operating system or platform. Processor 300 also communicates with the provisioning database 120, such as a database stored on a local hard drive. While illustrated as a local database in computing system 300, the provisioning database 120 can be separate from the computing system 300 and the cobbler server 102 can be configured to communicate with the remote provisioning database 120.

Processor 300 further communicates with network interface 304, such as an Ethernet or wireless data connection, which in turn communicates with one or more networks 115, such as the Internet or other public or private networks. Processor 300 also communicates with the provisioning database 120, the cobbler server 102, and the network management server 215, to execute control logic and perform the rescue processes described above and below.

As illustrated, the cobbler server 102 can be implemented as a software application or program capable of being executed by a conventional computer platform and stored in any type of conventional non-transitory computer readable medium, for example, a hard disk drive. Likewise, the cobbler server 102 can also be implemented as a software module or program module capable of being incorporated in other software applications and programs. In either case, the cobbler server 102 can be implemented in any type of conventional proprietary or open-source computer language.

As illustrated, the network management server 215 can be executed in the computing system 300. Likewise, the network management server 215 can be executed in a separate computing system including components similar to computing system 300. Accordingly, the computing system 300 can communicate with the network management server 215 via the network interface 304.

Figure 4:
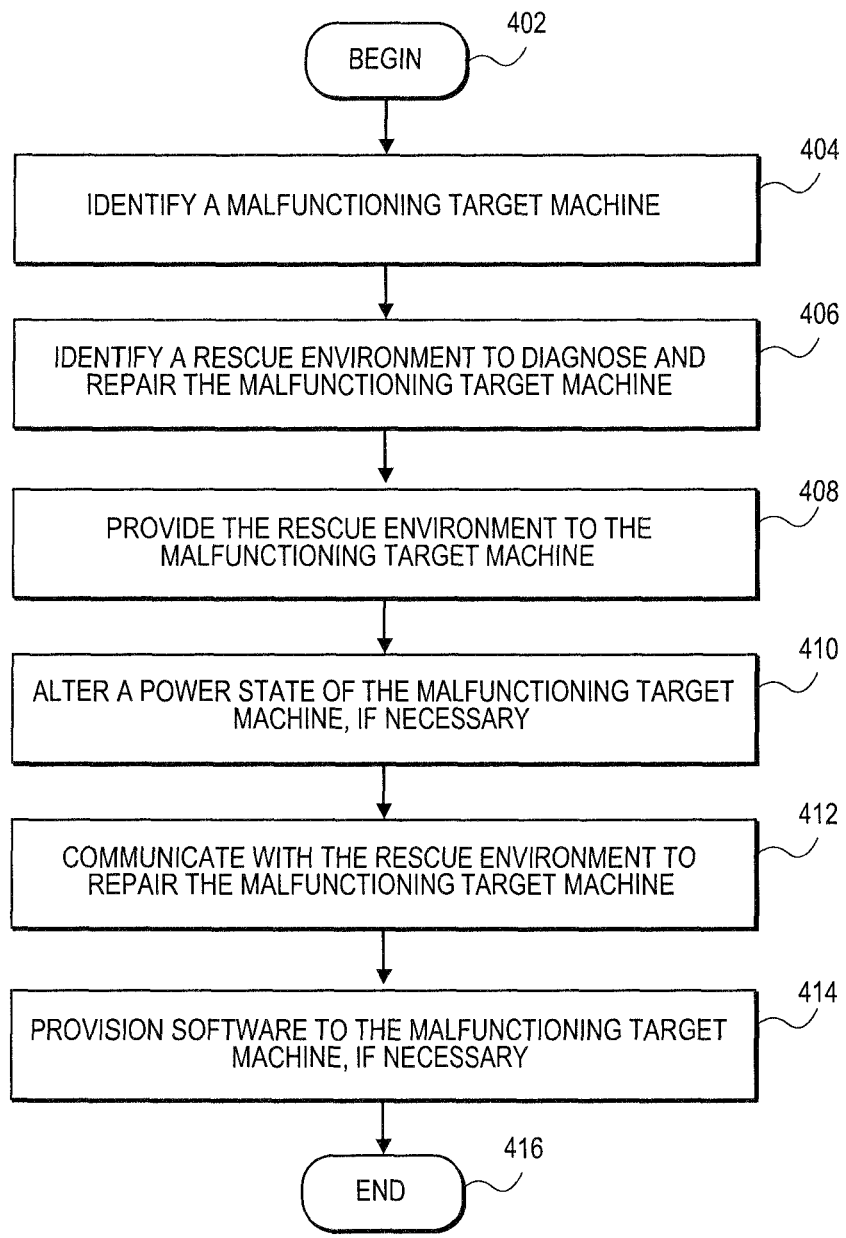
FIG. 4 illustrates a flowchart for providing a rescue environment for target machines, according to various embodiments.

FIG. 4 illustrates a flow diagram for providing a rescue environment in the provisioning environment 200, according to embodiments of the present teachings. In 402, the process can begin. In 404, the cobbler server 102 identifies a malfunctioning target machine 205. The cobbler server 102 can operate in conjunction with a network management server 215 in order to identify the malfunctioning target machine 205. The cobbler server 102 can receive an identification of the target machine that is malfunctioning from the network management server 215. For example, the network management server 215 can monitor the target machines 205 and notify the cobbler server 102 of the malfunctioning target machine 205. Likewise, the cobbler server 102 can instruct the network management server 215 to locate and identify any malfunctioning target machines. Additionally, the cobbler server 102 can independently identify the malfunctioning target machine 205.

In 406, the cobbler server 102 identifies a rescue environment 220 to diagnose and repair the malfunctioning target machine 205. The cobbler server 102 can identify the rescue environment 220 by locating the specifications of the malfunctioning target machine (software and/or hardware) in the inventory 235 and locating the rescue environment 220 from the set of rescue environments 225 compatible with the specifications of the malfunctioning target machine. For example, the cobbler server 102 can locate the rescue environment 220 compatible with the operating system of the malfunctioning target machine 205. Additionally, the cobbler server 102 can maintain a reference to the rescue environment 220, which is compatible with the different target machines 205, in the inventory 235 associated with the appropriate target machine 205.

In 408, the cobbler server 102 provides the rescue environment 220 to the malfunctioning target machine 205. The cobbler server 102 can transmit the rescue environment to the malfunctioning target machine 205 via a network connection with the network 115. Likewise, the cobbler server 102 can be configured to utilize the koan client 114 to assist in providing the rescue environment 220 to the malfunctioning target machine 205.

In 410, if necessary, the cobbler server 102 instructs the power management system to perform the alteration of the power state of the malfunctioning target machine 205 to initiate the execution of the rescue environment 220. The power management module 230 can be configured to generate a command or instruction. The instruction can include access information for the power management systems 210 and the power state alteration to be performed. The power management module 230 can be configured to form the instruction in a protocol utilized by the particular power management systems 210. For example, the cobbler server 102 can be configured to utilize conventional or proprietary protocols and tools such as IPMI, CMAN, ILO, fence agents, and the like. The power management module 230 can be configured to determine the protocol from the inventory 235. Once generated, the cobbler server 102 can be configured to transmit the instruction to the determined power management systems 210.

In 412, the cobbler server 102 communicates with the rescue environment 220 to repair the malfunctioning target machine 205. For example, the cobbler server 102 can utilize the rescue environment 220 to examine and alter settings and parameters of software, such as the OS, and hardware on the malfunctioning target machine 205.

In 414, if necessary, the cobbler server 102 provisions software to the malfunctioning target machine 205. The cobbler server 102 can maintain a record of previous software installed on the malfunctioning target machine 205. For example, the cobbler server 102 can maintain previous profiles installed on the malfunctioning target machine 205. If necessary, the cobbler server 102 can be configured to identify the previously installed software on the malfunctioning target machine 205 and provide the previously installed software to the malfunctioning target machine 205 for re-installation. For example, the cobbler server 102 can identify a previously profile and provision software to the malfunctioning target machine 205 based on the previous profile.

In 416, the process can end, but the process can return to any point and repeat.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   identifying a target machine, in a network of target machines, unable to boot;
   determining a specification of software installed on the target machine and a specification of hardware of the target machine, wherein the specification of software comprises an operating system identifier and the specification of hardware comprises a network hardware address;
   locating a compatible rescue environment capable of being executed on the target machine, wherein the compatible rescue environment is identified in view of the specification of hardware and the specification of software of the target machine, wherein the rescue environment comprises a software appliance, and wherein the specifications are determined from a record of the target machine;
   providing the rescue environment to the target machine over a network connection; and
   communicating, using a hardware processor, with the rescue environment to remotely manage a repair of the target machine.

2. The method of claim 1, wherein identifying the target machine comprises: receiving an indication that identifies the target machine from a network management server.

3. The method of claim 1, the method further comprising:
   determining a set of software previously installed on the target machine; and
   providing the set of software to the target machine over the network connection.

4. The method of claim 3, wherein the set of software is determined from a record of the network of target machines.

5. The method of claim 1, the method further comprising:
   sending instructions to alter a power state of the target machine after providing the rescue environment.

6. A system comprising:
   a network interface to a network of target machines; and
   a hardware processor, to communicate with the network interface, the hardware processor to:
   identify a target machine, in the network of target machines, unable to boot;
   determine a specification of the software installed on the target machine and a specification of hardware of the target machine, wherein the specification of software comprises an operating system identifier and the specification of hardware comprises a network hardware address;
   locate a compatible rescue environment capable of being executed on the identified target machine, wherein the compatible rescue environment is identified in view of the specification of hardware and the specification of software of the target machine, wherein the rescue environment comprises a software appliance, and wherein the specifications are determined from a record of the target machine;
   provide the rescue environment to the target machine over the network interface to the network of target machines; and
   communicate with the rescue environment to remotely manage a repair of the target machine.

7. The system of claim 6, wherein identifying the target machine comprises:
   receiving an indication that identifies the target machine from a network management server.

8. The system of claim 6, the hardware processor to:
   determine a set of software previously installed on the target machine; and
   provide the set of software to the target machine over the network connection.

9. The system of claim 8, wherein the set of software is determined from a record of the network target machines.

10. The system of claim 6, wherein the hardware processor to:
    send instructions to alter a power state of the target machine after providing the rescue environment.

11. A non-transitory computer readable medium comprising instructions for causing a hardware processor to perform operations comprising:
    identifying a target machine, in a network of target machines, unable to boot;
    determining a specification of software installed on the target machine and a specification of hardware of the target machine, wherein the specification of software comprises an operating system identifier and the specification of hardware comprises a network hardware address;
    locating a compatible rescue environment capable of being executed on the target machine, wherein the compatible rescue environment is identified in view of the specification of hardware and the specification of software of the target machine, wherein the rescue environment comprises a software appliance, and wherein the specifications are determined from a record of the target machine;
    providing the rescue environment to the target machine over a network connection; and
    communicating, using a hardware processor, with the rescue environment to remotely manage a repair of the target machine.

12. The non-transitory computer readable medium of claim 11, wherein identifying the target machine comprises:
    receiving an indication that identifies the target machine from a network management server.

13. The non-transitory computer readable medium of claim 11, the operations further comprising:
    determining a set of software previously installed on the target machine; and
    providing the set of software to the target machine over the network connection.

14. The non-transitory computer readable medium of claim 13, wherein the set of software is determined from a record of the network of target machines.

15. The non-transitory computer readable medium of claim 11, the operations further comprising:
    sending instructions to alter a power state of the target machine after providing the rescue environment.

* * * * *